(12) United States Patent
Talan et al.

(10) Patent No.: US 8,126,820 B1
(45) Date of Patent: Feb. 28, 2012

(54) COMMUNITY TO SUPPORT THE DEFINITION AND SHARING OF SOURCE TRUST LEVEL CONFIGURATIONS

(75) Inventors: Jonathan M. Talan, Frisco, TX (US); Jeffrey O. Pfeiffer, Lewisville, TX (US); Frederick M. Mozer, Richardson, TX (US); Mark A. Johnson, McKinney, TX (US); Thomas M. Jones, Dallas, TX (US)

(73) Assignee: Intuit Inc., Mountain View, CA (US)

( * ) Notice: Subject to any disclaimer, the term of this patent is extended or adjusted under 35 U.S.C. 154(b) by 913 days.

(21) Appl. No.: 11/700,287

(22) Filed: Jan. 30, 2007

(51) Int. Cl.
*G06Q 10/00* (2006.01)
(52) U.S. Cl. .............................. 705/319; 705/30; 705/31
(58) Field of Classification Search .............. 705/1, 319, 705/30, 31
See application file for complete search history.

(56) References Cited

U.S. PATENT DOCUMENTS

| | | | |
|---|---|---|---|
| 2002/0103801 A1* | 8/2002 | Lyons | 707/9 |
| 2002/0111888 A1* | 8/2002 | Stanley et al. | 705/31 |
| 2003/0063072 A1* | 4/2003 | Brandenberg et al. | 345/173 |
| 2004/0064335 A1* | 4/2004 | Yang | 705/1 |
| 2007/0074151 A1* | 3/2007 | Rivera et al. | 717/104 |
| 2007/0078845 A1* | 4/2007 | Scott et al. | 707/5 |
| 2007/0106577 A1* | 5/2007 | Kopp et al. | 705/35 |
| 2007/0255574 A1* | 11/2007 | Polo-Malouvier et al. | 705/1 |

(Continued)

OTHER PUBLICATIONS

Baum, Dan. "How to Manage Paper Forms along with Electronic Forms Processing". Today. Boston: Aug. 2005. p. 6.*

* cited by examiner

*Primary Examiner* — Gabrielle McCormick
(74) *Attorney, Agent, or Firm* — Osha • Liang LLP

(57) ABSTRACT

A method for managing trust level in a community comprises selecting a data provider and a data entry entity from the community, wherein the community comprises data providers providing provided data, data entry entity providers providing data entry entities, and reviewers, obtaining provided data and a trust level of the provided data from the data provider, retrieving a data entry quality level of the selected data entry entity from a community system, wherein the community system comprises data entry quality levels corresponding to the data entry entities, and determining a data source trust level based on the trust level of the provided data and the data entry quality level of the selected data entry entity, wherein the data source trust level indicates validity of data produced by the selected data entry entity.

26 Claims, 4 Drawing Sheets

COMMUNITY TO SUPPORT THE DEFINITION AND SHARING OF SOURCE TRUST LEVEL CONFIGURATIONS

CROSS-REFERENCE TO RELATED APPLICATIONS

Subject matter contained in the present document may be related to subject matter contained in co-pending U.S. patent application Ser. No. 11/700,580, entitled "Mechanism for Indicating and Resolving the Trust Level of Information,", filed on Jan. 30, 2007, and assigned to the same assignee.

BACKGROUND

Every year millions of people use software for various purposes, e.g., keeping track of personal finances, managing projects, processing medical claims, managing corporate accounting and financial information, filing required documents with the government, tax planning, inventory management, business operation management (e.g., strategic planning, sales forecasting, distribution channel management, and other business-related activities), and the like. Many software applications are form-based in that the applications offer the ability to perform data entry, edit, and review via multiple forms associated with a common task. Specifically, software applications present multiple forms and collect inputs from a user through a user interface, such as a graphical user interface (GUI). In addition, form-based software applications may produce multiple output forms, or documents, based on the collected input data and certain algorithm embedded in the software application, commonly referred to as a generation engine or a calculation engine. The generation engine or the calculation engine may include functionalities to generate or calculate a result based on mathematical or logical operations.

Users of software applications (e.g., financial software, medical software, inventory control software, and the like) must be able to trust the quality of the data source behind the multiple forms presented by the software. Regardless of whether the data fields contain data inputted directly or derived from other data, a reviewer must have a means of determining the original data source, or sources, and assessing a level of trust, i.e., trust level, before the reviewer can determine the validity (e.g., correctness, exactness, accuracy, precision, trustworthiness, error or mistake-free, conformity to a standard or model, or according to other suitable measure of being valid) of the final output document. Maintaining a standard measure of quality is important when providing trusted data. Evaluating the quality of data and trusting the data source requires a system of quality control that often involves a multi-stage evaluation process to determine whether data from a source A, e.g., a temporary employee performing data entry, is any more or less valid than data automatically retrieved from another source B, e.g., a bank.

Defining trust level configurations and specifications is a knowledge intensive and time intensive process with a high maintenance cost since trust levels and data sources can change rapidly. A knowledgeable community is able to offer assistance when defining and maintaining trust level configurations by sharing community trust level offerings.

SUMMARY

In general, in one aspect, the invention relates to a method for managing trust level in a community. The method comprises selecting a data provider of a plurality of data providers and a data entry entity of a plurality of data entry entities from the community, wherein the community comprises the plurality of data providers providing a plurality of provided data, a plurality of data entry entity providers providing the plurality of data entry entities, and a plurality of reviewers, obtaining provided data and a trust level of the provided data from the data provider, retrieving a data entry quality level of the data entry entity from a community system, wherein the community system comprises a plurality of data entry quality levels corresponding to the plurality of data entry entities, and determining a source trust level based on the trust level of the provided data and the data entry quality level of the data entry entity, wherein the source trust level indicates validity of output data produced by the data entry entity processing the provided data.

In general, in one aspect, the invention relates to a community system for managing trust level in a community. The community system comprises a repository configured to store a plurality of trust level configurations corresponding to a plurality of providers in the community, a logic module operatively coupled to the repository and configured to receive and provide the plurality of trust level configurations and means for selecting a provider from the plurality of providers based on a trust level configuration of the provider for achieving a pre-determined requirement of a result trust level, wherein the result trust level is generated by a software application using the trust level configuration of the selected provider for indicating validity of a result.

In general, in one aspect, the invention relates to a computer readable medium, embodying instructions executable by the computer to perform method steps for managing trust level in a community, the instructions comprising functionality to receive and store a plurality of trust level configurations corresponding to a plurality of providers in the community, to provide the plurality of trust level configurations, and to select a provider from the plurality of providers based on a trust level configuration of the provider for achieving a pre-determined requirement of a result trust level, wherein the result trust level is generated by a software application using the trust level configuration of the selected provider for indicating validity of a result.

In general, in one aspect, the invention relates to a computer readable medium, embodying instructions executable by the computer to perform method steps for managing trust level in a community, the instructions comprising functionality to select a data provider of a plurality of data providers and a data entry entity of a plurality of data entry entities from the community, wherein the community comprises the plurality of data providers providing a plurality of provided data, a plurality of data entry entity providers providing the plurality of data entry entities, and a plurality of reviewers, to obtain provided data and a trust level of the provided data from the data provider, to retrieve a data entry quality level of the data entry entity from a community system, wherein the community system comprises a plurality of data entry quality levels corresponding to the plurality of data entry entities, and to determine a source trust level based on the trust level of the provided data and the data entry quality level of the data entry entity, wherein the source trust level indicates validity of output data produced by the data entry entity processing the provided data.

Other aspects and advantages of the invention will be apparent from the following description and the appended claims.

DETAILED DESCRIPTION

Figure 1:
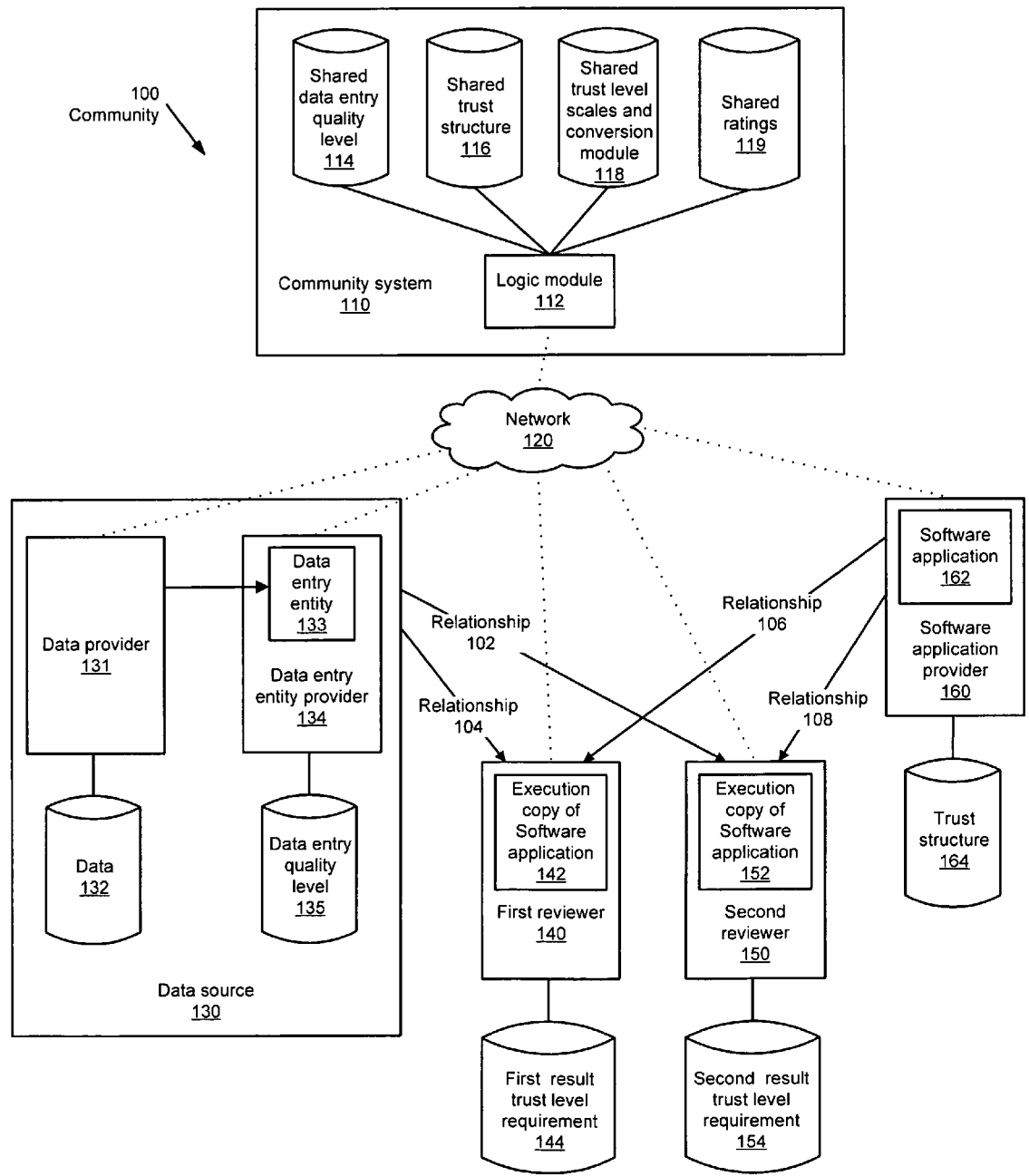
FIG. 1 shows an example of sharing trust level configurations in a community in accordance with aspects of the invention.

Specific embodiments of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, in one aspect, the invention relates to a system (or mechanism) and method for providing functionality to upload, store, and peruse trust level configurations and specifications for sharing within a community, e.g., a financial community. Further, in general, in one aspect, the invention relates to a system (or mechanism) and method to provide review ratings of the trust level configurations for sharing with a community.

For instance, the system and method allows a data provider, a data entry entity, and financial software to package and label trust level configurations. Further, trust level configurations may be uploaded to a web site where the trust level configurations can be stored and cataloged. Users seeking to leverage the trust level capabilities for a particular application(s) can peruse the website and retrieve the configurations for their software and applications, e.g., tax preparation, personal accounting, claim processing, inventory management, and the like. More details of mechanisms for indicating and resolving the trust level of inputted or imported information for purposes of validation and review may be found in U.S. application Ser. No. 11/700,580 entitled "Mechanism for Indicating and Resolving the Trust Level of Information," filed on Jan. 30, 2007.

FIG. 1 shows an example of sharing trust level configurations in a community in accordance with aspects of the invention. The community (100) includes community system (110), network (120), data source (130), first reviewer (140) with associated execution copy of software application (142) and first result trust level requirement (144), second reviewer (150) with associated execution copy of software application (152) and second result trust level requirement (154), software application provider (160) with associated software application (162) and trust structure (164), and multiple relationships (e.g., relationship (102), relationship (104), relationship (106), and relationship (108)). In one or more embodiments of the invention, the community system (100) and its various components may be hosted on one or more servers (not shown). Further, in one or more embodiments of the invention, more than one community system (110) and more than one network (120) may also be included in the community (100).

The community system (110) further includes logic module (112), shared data entry quality level information (114), shared trust structure information (116), shared trust level scales and conversion module (118), and shared ratings information (119). Logic module (112) may be implemented as hardware, software, or a combination thereof. As software, logic module (112) may be implemented using a variety of structure and unstructured programming languages, including Java, C, C++, C#, machine assembly, and/or other programming languages.

One skilled in the art will appreciate that components (e.g., shared data entry quality level information (114), shared trust structure information (116), shared trust level scales and conversion module (118)) may be varied, supplemented, or replaced. Further, shared ratings (119) may be stored in various different formats of storage devices (e.g., mechanical hard disk, flash memory, and/or other storage media) and be implemented in various data structures (e.g., files, arrays, data bases, relational data bases, etc.).

The data source (130) includes data provider (131) with associated data (132), data entry entity provider (134) with associated data entry entity (133) and data entry quality level information (135). In one or more embodiments of the invention, the types, number, and configuration of components may be varied. For example, although only one data source (130) is shown in this example, the invention may be practiced in other exemplary communities having more than one data source, more than one data provider for providing data, more than one data entry entity provider each for providing one or more data entry entities, and more than one software application provider for providing one or more software applications. Further, different number of reviewers and different number or types of relationships may be included in the community (100) in accordance with one or more embodiments of the invention.

In one or more embodiments of the invention, data provider (131), data entry entity provider (134), first reviewer (140), second reviewer (150), and software application provider (160) may access community system (110) through network (120) (e.g., LAN, WAN, MAN, Internet, Intranet, wired network, wireless network, and/or other networking infrastructures) for accessing (e.g., providing, storing, retrieving, etc.) information (e.g., shared data entry quality level information (114), shared trust structure information (116), shared trust level scales and conversion module (118), and shared ratings information (119)).

In one or more embodiments of the invention, software application (162) and its associated trust structure (164) may be customized for various purposes, appearance, and functions. For example, software application (162) may provide functionality for keeping track of personal finances, managing projects, processing medical claims, managing corporate accounting and financial information, filing required documents with the government, tax planning, inventory management, and the like.

Continuing with the discussion of FIG. 1, data provider (131) provides data (132) to data entry entity (133). In one or more embodiments of the invention, the data provider (131) may be a software application exporting data (132) and/or the data provider (131) may be an individual providing data (132). For example, a trust level (not shown) may be assigned to, or associated with, data (132) as described in more detail in U.S. application Ser. No. 11/700,580 entitled "Mechanism for Indicating and Resolving the Trust Level of Information," filed on Jan. 30, 2007.

The trust level may be assigned, or associated, by the data provider (131) according to certain trust level scales (e.g., a numbered scale from 1 to 10, a percentage scale from 0 percent to 100 percent, a rating scale of un-trusted, semi-trusted, and trusted, or other appropriate scales for indicating trust level by the data provider (131)). Data entry entity provider (134) may provide a data entry entity (133) for processing the data (132) into input data (not shown) allowing execution copy of software application (142). In one or more embodiments of the invention, the data entry entity (133) is one or more data entry specialists (e.g., an entry level clerk, an experienced professional, full time employees, part time contractors, etc.) and the data entry entity provider (134) may be a data entry service department in a corporation or a third party business operation providing data entry services on contract basis.

In one or more embodiments of the invention, the data entry entity provider (134) evaluates the data entry entity (133) from time to time for compiling a measure of performance evaluation, such as the data entry quality level (135) or other similar performance related information. Alternatively, the data entry entity (133) may be an automatic data entry scanner, a data import software module, or other appropriate automated data entry schemes performed without manual data entry activity (not shown).

These automated schemes may also be evaluated by the data entry entity provider (134) for compiling the measure of performance evaluation, such as the data entry quality level (135) or other similar performance related information. For example, the data entry quality level (135) may be determined according to certain scales (e.g., a numbered scale from 1 to 10, a percentage scale from 0 percent to 100 percent, a rating scale of un-trusted, semi-trusted, and trusted, or other appropriate scales for indicating data entry quality level by the data entry entity provider (134)). In one example, the data entry quality level (135) may be provided by the data entity provider (134) to the first reviewer (140) and the second reviewer (150) via relationships (104) and (102), respectively. In other examples, the data entry quality level (135) may be provided to the community system (110) and stored as part of the shared data entry quality level information (114) by the data entry entity provider (134) to be shared within the community (100).

In one or more embodiments of the invention, the data entry quality level (135) may be provided by the data entry entity (133) directly. In other embodiments of the invention, the data entry quality level (135) may be provided by the first reviewer (140) or the second reviewer (150) as a result of the review activity.

In one or more embodiments of the invention, the data provider (131) and the data entry entity (133) may together be referred to as a data source (130). In one or more embodiments of the invention, a source trust level may be determined and provided by the data entry entity (133) through the data entry process for indicating validity of the data source (130). For example, the source trust level may be determined based on the trust level of the data (132) and the data entry quality level (135) according to a pre-determined formula established by the data entry entity provider (134). In another example, the source trust level may be represented by the trust level of the data (132) and the data entry quality level (135) without being combined. In this configuration, the trust level of the data (132) from the data provider (131) may simply be passed through along with the data (132) by the data entry entity (133) through the data entry process. In one or more embodiments of the invention, the pre-determined formula may be a built-in functionality of the execution copy of software application (142). Alternatively, the execution copy of software application (142) may include the functionality for allowing the pre-determined formula to be configured by the first reviewer (140).

One skilled in the art will appreciate that a pre-determined formula may be generally accepted within the community (100) and stored as part of the shared trust level scales and conversion module (118) of the community system (110) to be shared within the community (100). For example, the source trust level may be determined according to certain trust level scales (e.g., a numbered scale from 1 to 10, a percentage scale from 0 percent to 100 percent, a rating scale of un-trusted, semi-trusted, and trusted, or other appropriate scale for indicating source trust level).

In one or more embodiments of the invention, an input trust level for the execution copy of software application (142) may be determined based on the source trust level according to certain trust level scales (e.g., a numbered scale from 1 to 10, a percentage scale from 0 percent to 100 percent, a rating scale of un-trusted, semi-trusted, and trusted, or other appropriate scales for indicating input trust level). In one example, the input trust level scale may be pre-determined by the execution copy of software application (142). In other examples, the execution copy of software application (142) may include the functionality for allowing the input trust level scale to be configured (e.g., configured by the reviewer (144)).

In one or more embodiments of the invention, the scale of the trust level of the data (132), the scale of the data entry quality level (135), the scale of the source trust level of the data source (130), and the scale of the input trust level of the execution copy of software application (142) may be different. For example, some or all of these different scales may be convertible among themselves according to a conversion guide line or a conversion module (not shown). In one example, the conversion guide line or the conversion module may be agreed upon via the relationships (e.g., relationship (102), relationship (104), relationship (106), and relationship (108)). In other examples, these different scales, conversion guide line, and/or the conversion module may be generally accepted and shared in the community (100). Further, they may be provided to the community system (110) and stored as part of the shared trust level scales and the conversion module (119) by the data provider (131), the data entry entity provider (134), the reviewer (140), or the software application provider (160).

Continuing with the discussion of FIG. 1, software application provider (160) may include software application (162) for providing to the first reviewer (140) and the second reviewer (150). The software application (162) may be provided as the execution copies of software application (142) and software application (152), respectively.

In one or more embodiments of the invention, a trust structure (164) is associated with the software application (162). The trust structure (164) may be provided by the software application provider (160) to the first reviewer (140) and the second reviewer (150) for managing trust levels associated with the execution copies of software application (142) and software application (152) via relationships (106) and relationships (108), respectively. Alternatively, the trust structure (164) may be provided to the community system (110) and stored as part of the shared trust structure (116) by the software application provider (160) shared within the community (100). For example, an execution copy of software application (143) may be configured, installed, or adapted from the software application (162) to calculate a result (i.e., derived data) based on the input data (not shown) provided by the data entry entity (133) of the data source (130). Accordingly, a result trust level may be determined based on the input trust level according to the trust structure (164). For example, the trust structure (164) may be retrieved from the shared trust structure (116) of the community system (110) by the first reviewer (140).

In one or more embodiments of the invention, the first reviewer (140) may have a certain goal, objective, or requirement (e.g., the first result trust level requirement (144)) for the result trust level of the result calculated from the execution copy of software application (143). The first reviewer (140) may retrieve shared information from the community system (110) relating to the data entry quality level (135), the trust structure (164), and/or various trust level scales and conversion modules before selecting the data entry entity (133) and the execution copy of software application (142) for consideration of meeting the first result trust level requirement (144).

In one or more embodiments of the invention, the first reviewer (140) may request a different data entry entity (133) from the data entry entity provider (134) based on the review result. For example, the first reviewer (140) may request improved data entry quality level (135) by substituting an entry level clerk with an experienced professional to perform the data entry process, by substituting the manual data entry scheme with an automated data entry scheme, or by substituting the data entry entity provider (134) with other providers in the community (100) all together. In another example, if the data entry quality level (135) does not improve any further, the first reviewer (140) may seek other data providers in the community (100) that may provide an improved trust level of the provided data. In still another example, the first reviewer (140) may configure, install, or adapt the execution copy of software application (142) from a higher grade version of the software application (162). For example, a consumer version of the software application (162) may be substituted with a business version or an enterprise version with more a robust trust structure (164). In other examples, the first reviewer (140) may also make these selections based on consideration of the cost associated with the data entry entity (133) and the execution copy of software application (142).

Continuing with the discussion of FIG. 1, the first reviewer (140) may determine ratings of the data provider (131), the data entry quality (135), and the trust structure (164) based on the review result of comparing the achieved result trust level in comparison to the first required result trust level requirement (144). These ratings may be provided to the community system (110) and stored as part of the shared ratings information (119) to be shared within the community (100). For example, a second reviewer (150) may retrieve the ratings from the shared ratings information (119) for evaluating and selecting the data provider (131), the data entry entity provider (134), the data entry entity (133), software application provider (160), and the execution copy of software application (152). In another example, the various trust level scales, conversion guide lines, and/or conversion modules may also be evaluated, adapted, and evolved according to such review and rating activity such that the content of the shared trust level scales and conversion module (118) may be updated.

In one or more embodiments of the invention, the community (100) may be based on various different membership policies, such as open membership, invitation only membership, free membership, paid membership, flat membership, tiered membership, and other variations of membership policies. The access privileges (e.g., to provide, store, retrieve, etc.) may be provided to members in the community (100) according to such established membership policy. The access privileges may be administered in the community system (110) by the logic module (112). Additional administration and management functions of the community system (110) may also be implemented by the logic module (112).

Figure 2:
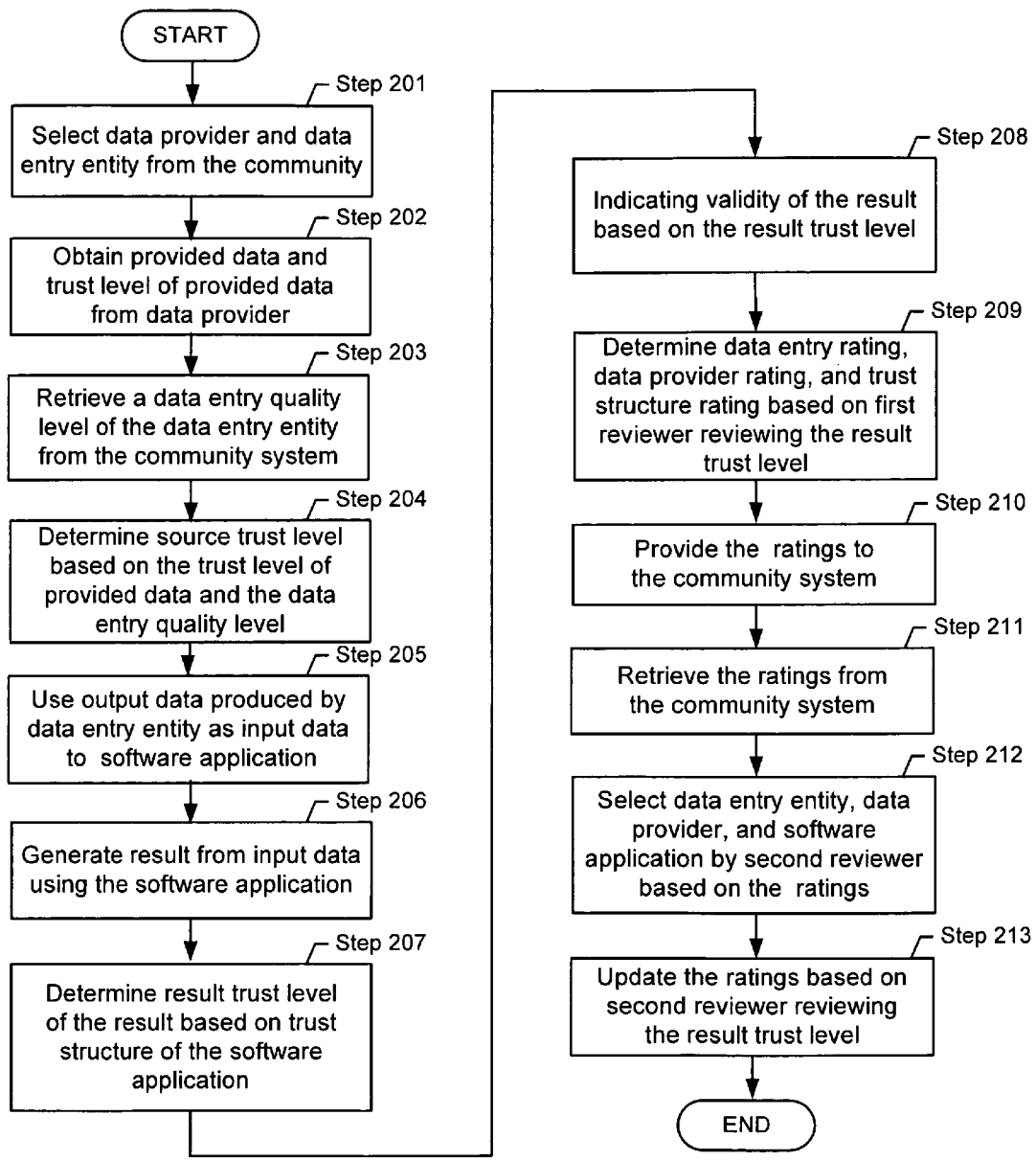
FIG. 2 shows a flow chart of a method for sharing trust level configurations in a community in accordance with aspects of the invention.

FIG. 2 shows an example a flow chart of a method for sharing trust level configurations in a community in accordance with aspects of the invention. Initially, a data provider (e.g., the data provider (131) in FIG. 1) and a data entry entity (e.g., the data entry entity (133) in FIG. 1) may be selected from the community (e.g., the community (100) in FIG. 1) (Step 201).

In one or more embodiments of the invention, the selection is made by a reviewer (e.g., the first reviewer (140) in FIG. 1) reviewing intermediate data of the software application to achieve certain required trust level (e.g., the first result trust level requirement (144) in FIG. 1). The provided data and a trust level associated with the provided data may then be obtained from the data provider (Step 202).

In one or more embodiments of the invention, a data entry quality level may be retrieved from a community system shared within the community (Step 203). Accordingly, a source trust level may then be determined based on the trust level of the provided data and the data entry quality level (Step 204).

In one or more embodiments of the invention, output data produced by the data entry entity may be used as an input data to a software application (Step 205). A result may then be generated from the input data by the software application (Step 206).

Further, a result trust level may be determined from the input trust level based on a trust structure of the software application (step 207). The trust structure may be shared within the community and may be retrieved from the community system. In one or more embodiments of the invention, the source trust level may be provided by the data entry entity or a provider of the data entry entity based on certain trust level scale, which may not be the same scale for the input trust level required by the software application. In one or more embodiments of the invention, both the trust level of the provided data and the data entry quality level may be passed from the data entry entity to the software application. Similarly, the trust level of the provided data from the data provider may not be based on the same scale for the input trust level required by the software application.

In one or more embodiments of the invention, Step 207 may necessarily convert between the trust levels of different scales according to an agreed upon conversion guide line or conversion module. In one or more embodiments of the invention, the conversion guide line or conversion module may be generally accepted within the community and may be shared via the community system.

Continuing with FIG. 2, validity (e.g., correctness, exactness, accuracy, precision, trustworthiness, error or mistake-free, conformity to a standard or model, or according to other suitable measure of being valid) of the result may be indicated based on the result trust level (Step 208). Moreover, ratings relating to data provider, data entry quality level, trust structure, and/or the trust level scale conversion guideline or conversion module may be determined by the first reviewer according to the result trust level comparison with respect to the requirement and/or other observations and review analysis (Step 209).

In one or more embodiments of the invention, these ratings are provided to the community system for storage and to be shared within and community (Step 210). Further, a second reviewer may retrieve these ratings information from the community system (Step 211).

In one or more embodiments of the invention, the rating information is referenced to select a data provider, data entry entity, and software application for achieving result trust level requirement relating to the second reviewer (Step 212). Additionally, ratings relating to data provider, data entry quality level, trust structure, and/or the trust level scale conversion guideline or conversion module may be modified or updated by the second reviewer according to the result trust level comparison with respect to the second requirement and/or other observations and review analysis (Step 213).

Figure 3:
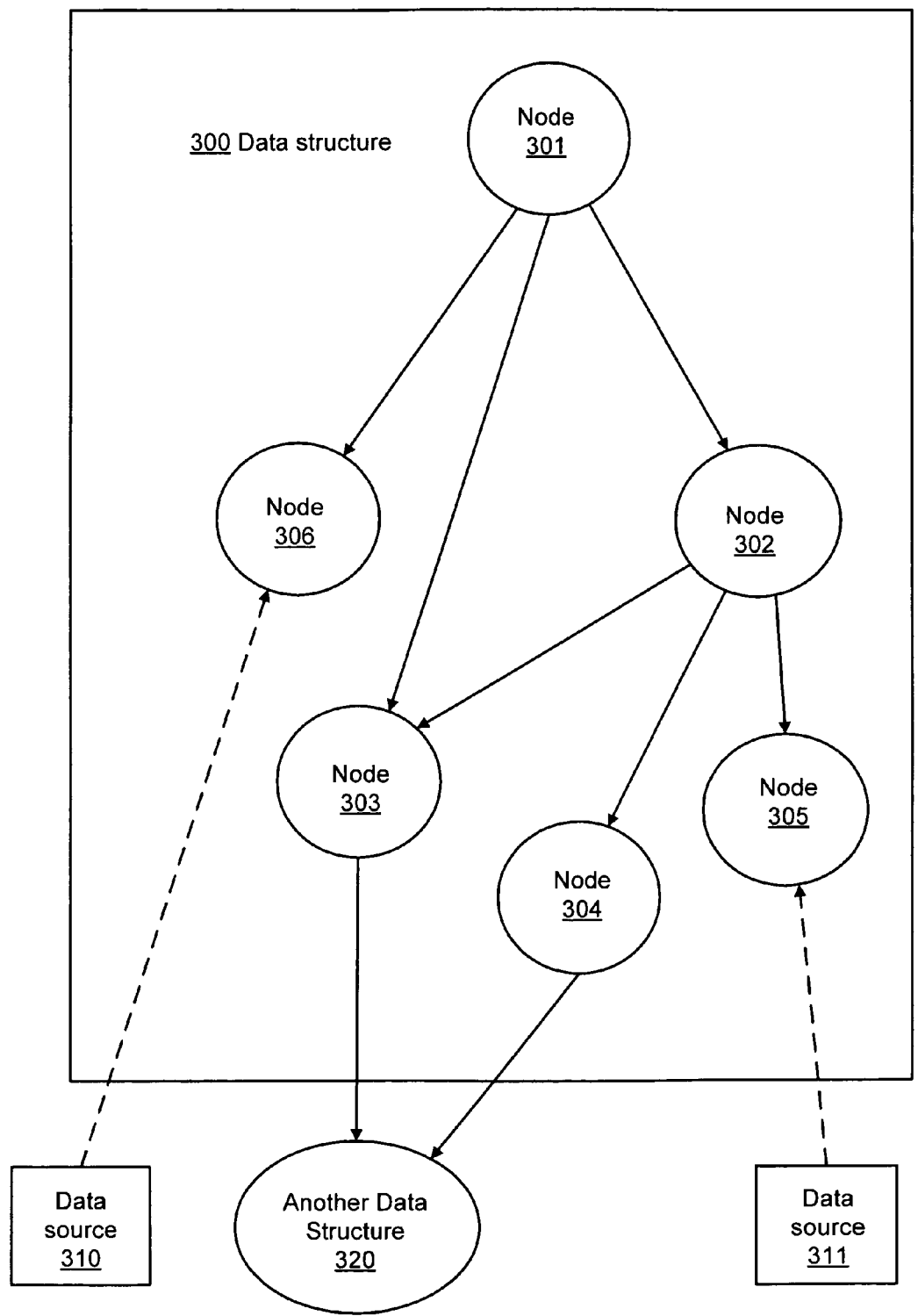
FIG. 3 shows a trust structure for representing trust levels in accordance with aspects of the invention.

FIG. 3 shows a data structure for representing trust levels of data in accordance with on or more embodiments of the invention. For example, the data structure (300) may correspond to the trust structure (164) as described in FIG. 1 above. The data structure (300) is shown as an ordered graph structure and may be referred to as a trust structure of the financial data. As known to those skilled in the art, the ordered graph structure is a widely used data structure in computer science that includes a set of nodes connected using edges. Each node has zero or more child nodes, which is typically shown below the node with an arrow pointed from the node to each child node.

A node that has a child is called the child's parent node. A node may have more than one parent. The parents of a node are the nodes connected to the node and precede the node in the ordering. The arrow connecting from a parent node to a child node represents the ordering. A node at the bottom most level is called a leaf node and has no children. An inner node is a node that has child nodes and is, thus, not a leaf node. Each node may correspond to a data field of the financial data, which may include multiple data fields. Each edge connecting two nodes may represent a relationship between two corresponding data fields. Each data field may contain data with an associated trust level.

As shown in FIG. 3, the data structure (300) includes inner nodes (e.g., Node (301), Node (302), Node (303), Node (304)) and leaf node (305) and leaf node (306). In addition, leaf node (305) and leaf node (306) are associated with data source (311) and data source (310), respectively. These associations represent that the data fields corresponding to leaf node (305) and leaf node (306) may collect data from the corresponding data sources through input of a user or by importing from another software application.

The trust levels corresponding to the leaf nodes may be defined by, e.g., set equal to, the trust levels of the user or the other software, respectively. Further, node (303) and node (304) are shown to be parents of another data structure (320) which may include one or more ordered graph structures representing separate portion(s) of the financial data. Although each leaf node is shown to be associated with only one data source in this example, the association may be different in other examples depending on the specific profile of the financial data and how data fields corresponding to leaf nodes may collect data from one or more data source(s) (e.g., data source (310) and data source (311)). For example, one leaf node may be associated with more than one data source (e.g., data source (310) and data source (311)). In another example, more than one leaf nodes may be associated with one data source (e.g., data source (310) and data source (311)).

In one or more embodiments of the invention, data source (310) and data source (311) may correspond to data source (130) as described in FIG. 1 above. For example, the data source (311) may include a data entry clerk (e.g., the data entry entity (133) as shown in FIG. 1) and a data provider (e.g., the data provider (131) as shown in FIG. 1). The data entry clerk may enter the data "Other income (loss)" into the data field. The data "Other income (loss)" may be looked up by the data entry clerk from the data provider. For example, the data provider may be an attachment in a hand written paper paper format, a printed paper format, a voice/video recording format, an electronic file format, or other suitable format for providing the data "Other income (loss)." In another example, the data source (311) may include an automated data scanner (data entry entity) with optical character recognition functionality for extracting the data "Other income (loss)" from the attachment (data provider) in a paper format.

In one or more embodiments of the invention, the data "Other income (loss)" may be imported automatically from the attachment (data provider) in an electronic format using a data import software module (data entry entity). For example, the attachment may be generated from another software application. In one or more embodiments of the invention, the data provider may also refer to the software generating the attachment or an individual providing the attachment. The trust level associated with the data provider and the data entry entity may be determined accordingly in each of these various different schemes of data source examples.

In general, a trust level associated with a data field corresponding to an inner node may be derived by first reducing the ordered graph structure to a tree structure. Only nodes and edges converging to the inner node of interest need to remain in the tree structure and the trust level may be derived according to the example above.

Figure 4:
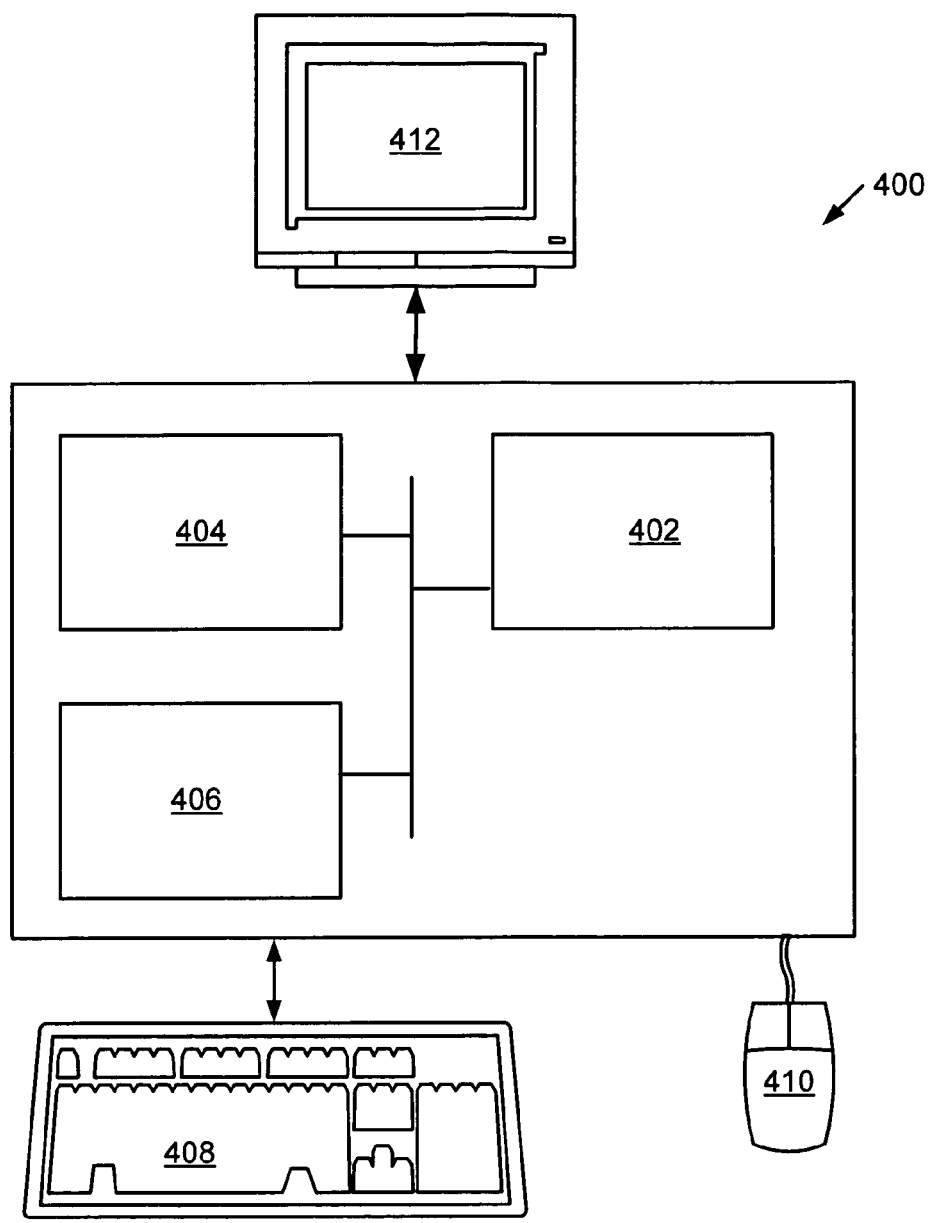
FIG. 4 shows a computer system in accordance with an embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., community system, data source, data provider, software application provider, trust structure, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for determining trust levels, comprising:
    selecting a first software application configured to provide data, wherein the first software application is selected from a plurality of data providers in a community;
    selecting a data import software configured to process data provided by the first software application into input data to a second software application, wherein the data import software is a data entry entity selected from a plurality of data entry entities in the community, wherein the first software application and the data entry entity together form a data source, and wherein the community comprises the plurality of data providers providing a plurality of provided data, a plurality of data entry entity providers for providing the plurality of data entry entities and assigning a quality level to each of the plurality of data entry entities, a plurality of software application providers for providing the first software application and the second software application, and a plurality of reviewers for rating each member of the community;

obtaining, using a processor of a computer system, the data provided by the first software application and a trust level of the data provided by the first software application;

retrieving, using the processor, the quality level of the selected data entry entity from a community system, wherein the quality level of the selected data entry entity is stored in the community system by a corresponding one of the plurality of data entry entity providers, wherein the community system is shared by the community and comprises a plurality of data entry quality levels corresponding to the plurality of data entry entities;

obtaining, using the processor, a pre-determined formula configured by a first reviewer of the plurality of reviewers for determining a data source trust level, wherein the first reviewer uses the second software application to configure the pre-determined formula;

determining, using the processor and by the second software application, the data source trust level based on the trust level of the data provided by the first software application and the quality level of the selected data entry entity according to the pre-determined formula, wherein the data source trust level indicates validity of data produced by the selected data entry entity;

obtaining an input trust level scale configured by the first reviewer for trust level conversion;

converting the data source trust level to an input trust level of the input data to conform to the input trust level scale;

retrieving a trust structure of the second software application from the community system, wherein the trust structure comprises nodes representing data fields of the second software application and edges each representing a relationship between two corresponding data fields containing data with associated trust levels;

identifying, within the nodes of the trust structure, a leaf node representing a first data field containing the input data with the input trust level and an inner node representing a result with a result trust level, wherein an edge between the leaf node and the inner node represents the relationship between the input data with the input trust level and the result with the result trust level, wherein the result is calculated from at least the input data by the second software application; and determining the result trust level from at least the input trust level according to the trust structure, wherein the result trust level indicates validity of the result.

2. The method of claim 1, wherein the trust level of the data provided by the first software application is assigned by the first software application.

3. The method of claim 1, wherein the trust structure is provided to the community system by a software application provider of the second software application, wherein the leaf node converges to the inner node within the trust structure, and wherein determining the result trust level from at least the input trust level according to the trust structure comprises reducing the trust structure to a tree structure comprising nodes and edges converging to the inner node within the trust structure.

4. The method of claim 1, wherein the input trust level of the input data to the second software application, the data source trust level of the data produced by the data entry entity, and the trust level of the data provided by the first software application are based on different scales of trust.

5. The method of claim 4, wherein the different scales of trust are convertible by using a conversion module.

6. The method of claim 1, further comprising:
selecting the data entry entity and the first software application by the first reviewer based on the data entry quality level and the trust level of the data provided by the first software application for achieving a pre-determined requirement of the result trust level.

7. The method of claim 1, further comprising:
determining a data entry rating of the data entry quality level and a data provider rating of the first software application based on the first reviewer reviewing the result trust level with respect to a first pre-determined requirement of the result trust level;

providing the data entry rating and the data provider rating to the community system;

retrieving the data entry rating and the data provider rating from the community system;

selecting the data entry entity and the first software application by a second reviewer based on the data entry rating and the data provider rating for achieving a second pre-determined requirement of the result trust level; and updating the data entry rating and the data provider rating based on the second reviewer reviewing the result trust level with respect to the second pre-determined requirement of the result trust level, wherein the community system further comprises a plurality of data entry ratings corresponding to the plurality of data entry entities and a plurality of data provider ratings corresponding to the plurality of data providers.

8. The method of claim 1, further comprising:
selecting the second software application by the first reviewer based on the trust structure for achieving a pre-determined requirement of the result trust level.

9. The method of claim 1, further comprising:
determining a trust structure rating of the trust structure based on the first reviewer reviewing the result trust level with respect to a first pre-determined requirement of the result trust level;

providing the trust structure rating to the community system;

retrieving the trust structure rating from the community system;

selecting the second software application by a second reviewer based on the trust structure rating for achieving a second pre-determined requirement of the result trust level; and updating the trust structure rating based on the second reviewer reviewing the result trust level with respect to the second pre-determined requirement of the result trust level, wherein the community system further comprises a plurality of trust structure ratings corresponding to the plurality of software applications.

10. The method of claim 1, wherein the plurality of provided data comprise at least one selected from a group consisting of financial data, medical data, inventory data, business operation data, sales forecasting data, and distribution channel management data.

11. A community system for determining trust levels, comprising:
a processor and memory storing instructions when executed by the processor comprising functionality for:
selecting a first software application configured to provide data, wherein the first software application is selected from a plurality of data providers in a community;
selecting a data import software configured to process data provided by the first software application into input data to a second software application, wherein the data import software is a data entry entity selected from a plurality of data entry entities in the community,
wherein the first software application and the data entry entity together form a data source, and
wherein the community comprises the plurality of data providers providing a plurality of provided data, a plurality of data entry entity providers for providing the plurality of data entry entities and assigning a quality level to each of the plurality of data entry entities, a plurality of software application providers for providing the first software application and the second software application, and a plurality of reviewers for rating each member of the community;
obtaining the data provided by the first software application and a trust level of the data provided by the first software application;
retrieving the quality level of the selected data entry entity from a community system, wherein the quality level of the selected data entry entity is stored in the community system by a corresponding one of the plurality of data entry entity providers, wherein the community system is shared by the community and comprises a plurality of data entry quality levels corresponding to the plurality of data entry entities;
obtaining a pre-determined formula configured by a first reviewer of the plurality of reviewers for determining a data source trust level, wherein the first reviewer uses the second software application to configure the pre-determined formula;
determining, by the second software application, the data source trust level based on the trust level of the data provided by the first software application and the quality level of the selected data entry entity according to the pre-determined formula, wherein the data source trust level indicates validity of data produced by the selected data entry entity;
obtaining an input trust level scale configured by the first reviewer for trust level conversion;
converting the data source trust level to an input trust level of the input data to conform to the input trust level scale;
retrieving a trust structure of the second software application from the community system, wherein the trust structure comprises nodes representing data fields of the second software application and edges each representing a relationship between two corresponding data fields containing data with associated trust levels;
identifying, within the nodes of the trust structure, a leaf node representing a first data field containing the input data with the input trust level and an inner node representing a result with a result trust level, wherein an edge between the leaf node and the inner node represents the relationship between the input data with the input trust level and the result with the result trust level, wherein the result is calculated from at least the input data by the second software application; and
determining the result trust level from at least the input trust level according to the trust structure, wherein the result trust level indicates validity of the result;
a repository of the community system configured to store the plurality of data entry quality levels; and
a logic module of the community system operatively coupled to the repository and configured to receive and provide the plurality of data entry quality levels.

12. The community system of claim 11,
wherein the trust level of the data provided by the first software application is assigned by the first software application.

13. The community system of claim 11, wherein the plurality of provided data comprise at least one selected from a group consisting of financial data, medical data, inventory data, business operation data, sales forecasting data, and distribution channel management data.

14. The community system of claim 11,
wherein the trust structure is provided to the community system by a software application provider of the second software application,
wherein the leaf node converges to the inner node within the trust structure, and
wherein determining the result trust level from at least the input trust level according to the trust structure comprises reducing the trust structure to a tree structure comprising nodes and edges converging to the inner node within the trust structure.

15. The community system of claim 11,
wherein the input trust level of the input data to the second software application, the data source trust level of the data produced by the data entry entity, and the trust level of the data provided by the first software application are based on a different scale of trust,
wherein the different scales of trust are convertible by using a conversion module,
wherein the repository is further configured to store the different scales of trust and the conversion module, and
wherein the logic module is further configured to receive and provide the different scales of trust and the conversion module.

16. The community system of claim 11, the instructions when executed by the processor further comprising functionality for:
determining a provider rating of the first software application, a data entry rating of the data entry quality level, and a trust structure rating of the trust structure based on the first reviewer reviewing the result trust level with respect to a first pre-determined requirement of the result trust level,
wherein the repository is further configured to store the provider rating, the data entry rating, and the trust structure rating, and
wherein the logic module is further configured to receive and provide the provider rating, the data entry rating, and the trust structure rating.

17. The community system of claim 16, wherein a second reviewer selects the first software application, the data entry entity, and the second software application based on the provider rating, the data entry rating, and the trust structure rating for achieving a second pre-determined requirement of the result trust level of the result.

18. The community system of claim 17, the instructions when executed by the processor further comprising functionality for:
modifying the provider rating, the data entry rating, and the trust structure rating based on the second reviewer reviewing the result trust level with respect to the second pre-determined requirement of the result trust level.

19. A non-transitory computer readable storage medium, embodying instructions executable by the computer to perform method steps for determining trust levels, the instructions comprising functionality to:
select a first software application configured to provide data, wherein the first software application is selected from a plurality of data providers in a community;
select a data import software configured to process data provided by the first software application into input data to a second software application, wherein the data import software is a data entry entity selected from a plurality of data entry entities in the community,
wherein the first software application and the data entry entity together form a data source, and
wherein the community comprises the plurality of data providers providing a plurality of provided data, a plurality of data entry entity providers for providing the plurality of data entry entities and assigning a quality level to each of the plurality of data entry entities, a plurality of software application providers for providing the first software application and the second software application, and a plurality of reviewers for rating each member of the community;
obtain the data provided by the first software application and a trust level of the data provided by the first software application;
retrieve the quality level of the selected data entry entity from a community system, wherein the quality level of the selected data entry entity is stored in the community system by a corresponding one of the plurality of data entry entity providers, wherein the community system is shared by the community and comprises a plurality of data entry quality levels corresponding to the plurality of data entry entities;
obtain a pre-determined formula configured by a first reviewer of the plurality of reviewers for determining a data source trust level, wherein the first reviewer uses the second software application to configure the pre-determined formula;
determine, by the second software application, the data source trust level based on the trust level of the data provided by the first software application and the quality level of the selected data entry entity according to the pre-determined formula, wherein the data source trust level indicates validity of data produced by the selected data entry entity;
obtain an input trust level scale configured by the first reviewer for trust level conversion;
convert the data source trust level to an input trust level of the input data to conform to the input trust level scale;
retrieve a trust structure of the second software application from the community system, wherein the trust structure comprises nodes representing data fields of the second software application and edges each representing a relationship between two corresponding data fields containing data with associated trust levels;
identify, within the nodes of the trust structure, a leaf node representing a first data field containing the input data with the input trust level and an inner node representing a result with a result trust level, wherein an edge between the leaf node and the inner node represents the relationship between the input data with the input trust level and the result with the result trust level, wherein the result is calculated from at least the input data by the second software application; and
determine the result trust level from at least the input trust level according to the trust structure, wherein the result trust level indicates validity of the result.

20. The non-transitory computer readable medium of claim 19,
wherein the trust level of the data provided by the first software application is assigned by the first software application.

21. The non-transitory computer readable medium of claim 19, wherein the plurality of provided data comprises at least one selected from a group consisting of financial data, medical data, inventory data, business operation data, sales forecasting data, and distribution channel management data.

22. The non-transitory computer readable medium of claim 19,
wherein the trust structure is provided to the community system by a software application provider of the second software application,
wherein the leaf node converges to the inner node within the trust structure, and
wherein determining the result trust level from at least the input trust level according to the trust structure comprises reducing the trust structure to a tree structure comprising nodes and edges converging to the inner node within the trust structure.

23. The non-transitory computer readable medium of claim 19,
wherein the input trust level of the input data to the second software application, the data source trust level of the data produced by the data entry entity, and the trust level of the data provided by the first software application are based on a different scale of trust,
wherein the different scales of trust are convertible by using a conversion module,
wherein the repository is further configured to store the different scales of trust and the conversion module, and
wherein the logic module is further configured to receive and provide the different scales of trust and the conversion module.

24. The non-transitory computer readable medium of claim 19, the instructions further comprising functionality to determine a provider rating of the first software application, a data entry rating of the data entry quality level, and a trust structure rating of the trust structure based on the first reviewer reviewing the result trust level with respect to a first pre-determined requirement of the result trust level.

25. The non-transitory computer readable medium of claim 24, the instructions further comprising functionality to select the first software application, the data entry entity, and the second software application based on the provider rating, the data entry rating, and the trust structure rating by a second reviewer for achieving a second pre-determined requirement of the result trust level of the result.

26. The non-transitory computer readable medium of claim 25, the instructions further comprising functionality to modify the provider rating, the data entry rating, and the trust structure rating based on the second reviewer reviewing the result trust level with respect to the second pre-determined requirement of the result trust level.

* * * * *